Dec. 5, 1961  F. G. HEIMANN  3,011,455
MEAT SWITCHING APPARATUS
Filed Feb. 9, 1961  3 Sheets-Sheet 1
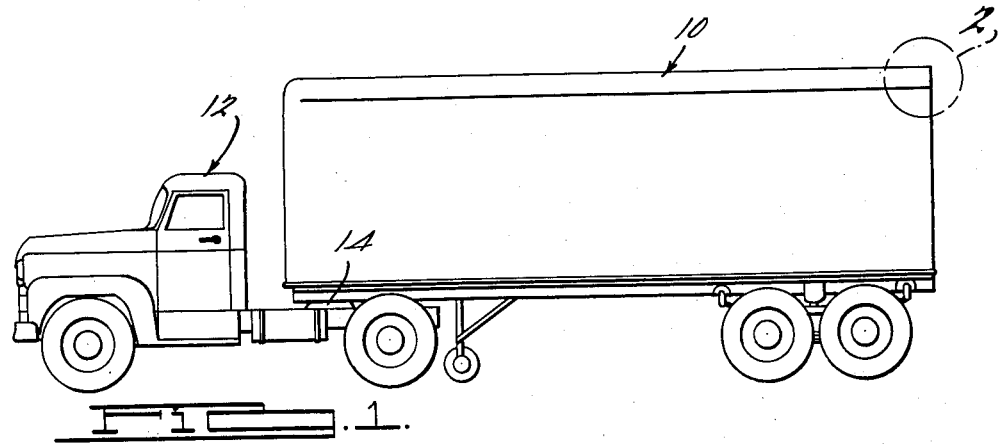
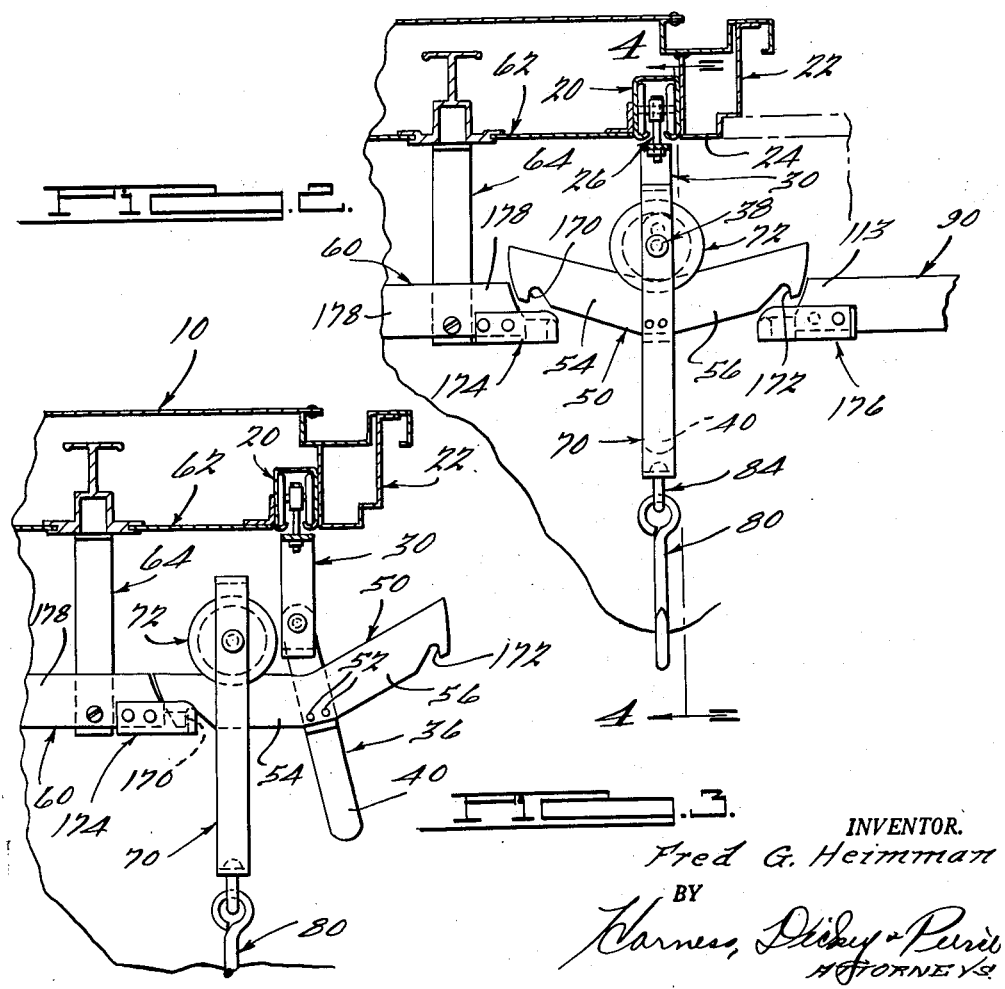
INVENTOR.
Fred G. Heimann
BY
Harness, Dickey & Pierce
ATTORNEYS

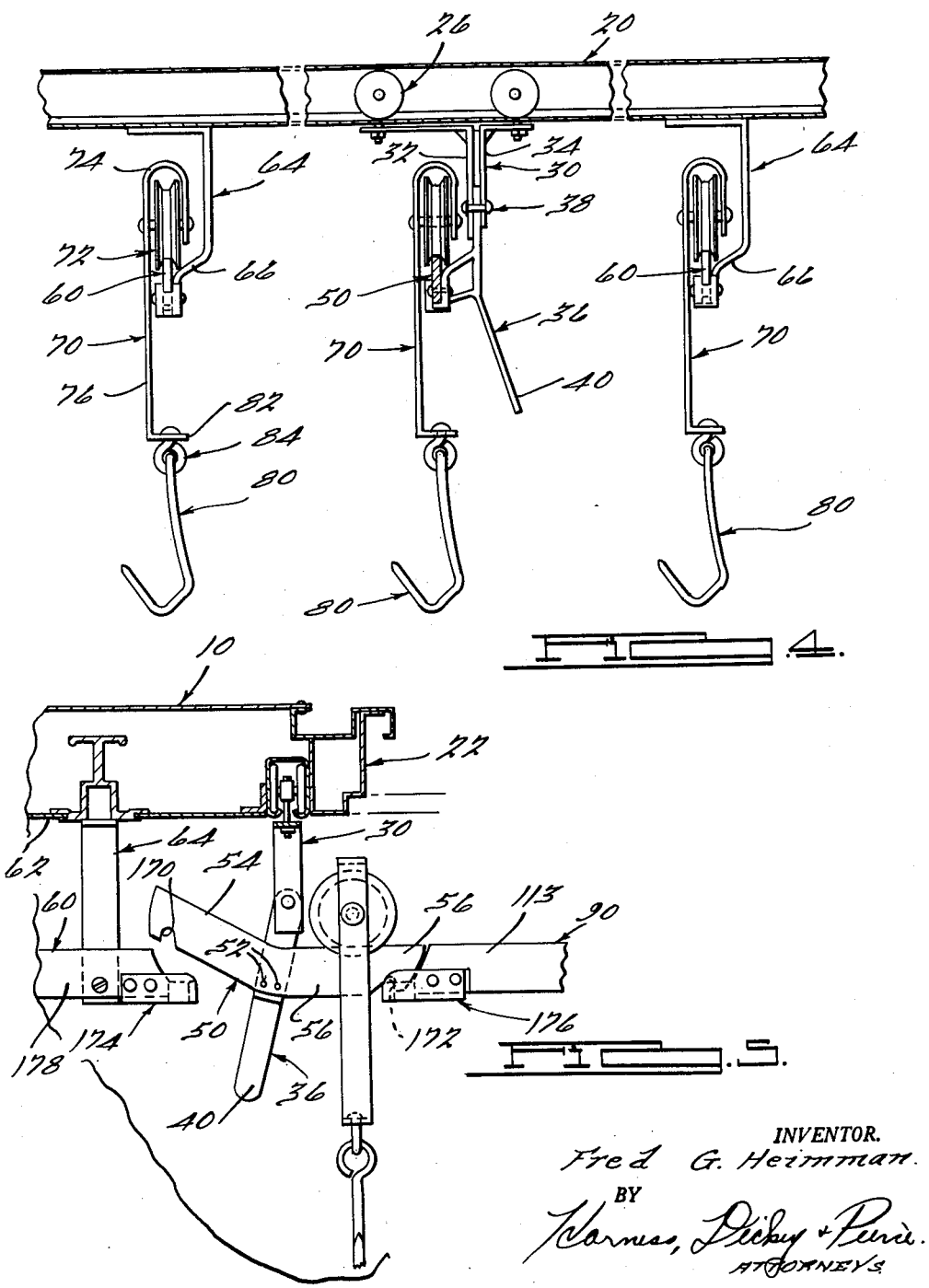

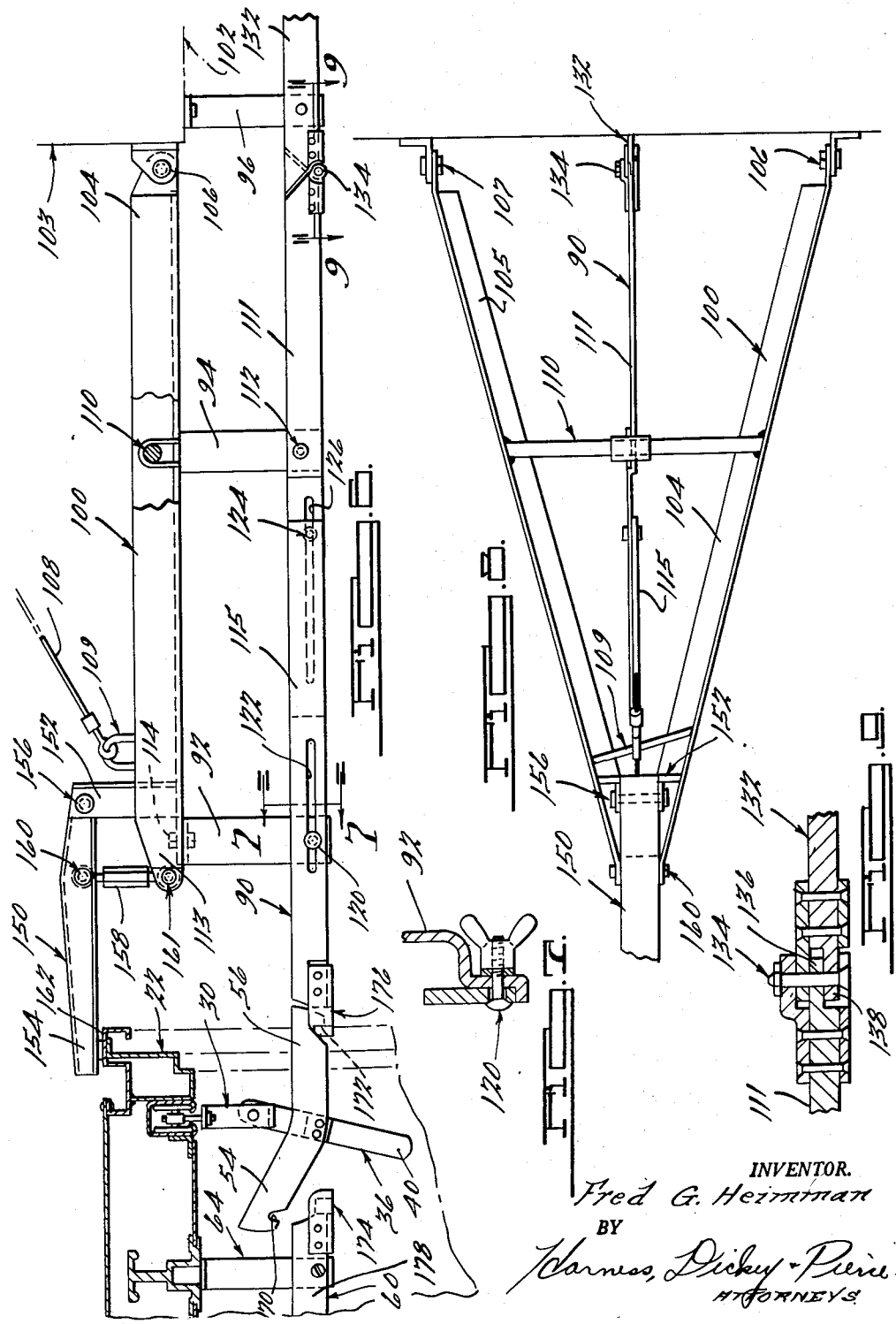

United States Patent Office 3,011,455
Patented Dec. 5, 1961

3,011,455
MEAT SWITCHING APPARATUS
Fred G. Heimann, Mount Clemens, Mich., assignor to Fruehauf Trailer Company, Detroit, Mich., a corporation of Michigan
Filed Feb. 9, 1961, Ser. No. 88,074
10 Claims. (Cl. 104—96)

This application relates generally to conveyor systems and more particularly to meat switching apparatus for a trailer body or the like.

Transfer of relatively heavy and bulky objects, for example, sides of beef between a trailer and, for example, a storage facility, is preferably accomplished without requiring manual lifting of the article being transferred. Transfer should be effected without the danger of dropping the article and without requiring precise alignment of the trailer body with the storage facility. Preferably, the trailer is simply backed up to the storage facility, misalignment therebetween being compensated for automatically.

Transfer of, for example, sides of beef between a trailer and a storage facility is materially expedited and simplified by the conveyor system of the present invention. The conveyor system utilizes a transverse trackway adjacent the rear door of the trailer body for the support of a laterally movable trolley. A carriage is suspended from the trolley and has a switch depending downwardly therefrom for the acceptance of meat transfer trolleys. The switch is of generally V-shaped configuration defined by upwardly extending rail sections that are selectively engageable with one of a plurality of longitudinally extending overhead rails within the trailer body or with an overhead rail extending into the storage facility. The V-shaped configuration of the switch inherently stabilizes the switch when a meat transfer trolley is supported thereon.

Accordingly, one object of the present invention is an improved conveyor system.

Another object is a switching apparatus for transferring articles between a storage facility and a trailer body.

Another object is a meat switching apparatus for transferring meat from a storage facility to a trailer body.

Another object is a switching apparatus that is inherently stable when a load is suspended therefrom.

Another object is an overhead conveyor system for a trailer body that need not be laterally aligned with an overhead rail leading into a storage facility.

Another object is an overhead conveyor system for a trailer body that simplifies positioning of the trailer with respect to a storage facility.

These and other objects will be apparent in the following specification, claims and drawings wherein:

FIGURE 1 is a side elevational view of a tractor and trailer provided with the meat switching apparatus of the present invention;

FIG. 2 is a vertical cross sectional view of the area within the circle "2" of FIG. 1 with the switch conditioned for lateral movement;

FIG. 3 is a cross sectional view similar to FIG. 2 showing the switch member rotated into engagement with an overhead rail of the trailer;

FIG. 4 is a cross sectional view taken substantially along the line 4—4 of FIG. 2;

FIG. 5 is a view similar to FIG. 2 showing the switch member rotated into engagement with the conveyor rail of the storage facility;

FIG. 6 is a side elevational view, partially in section, of a vertically adjustable and extensible rail section of the storage facility operatively associated with a trailer body;

FIG. 7 is a cross-sectional view taken substantially along the line 7—7 of FIG. 6;

FIG. 8 is a top view of the storage facility conveyor rail of FIG. 6; and

FIG. 9 is a cross-sectional view taken substantially along the line 9—9 of FIG. 6.

Referring to the drawings, a trailer body 10 is shown operatively coupled to a conventional tractor 12 as by a fifth wheel 14. The trailer body 10 is provided with a transverse trackway 20 (FIG. 2) on the inner side of the rear trailer header 22 which overlies the rear door opening 24 of the trailer 10. A wheeled trolley 26 is supported by the trackway 20 for movement laterally of the trailer body 10. The trolley 26 supports a downwardly depending carriage 30 defined by a pair of L-shaped members 32 and 34 (FIG. 4). A switch member 36 is pivotally supported by the carriage 30 as by a pin 38 for rotation about a horizontal axis. The switch member 36 has a handle portion 40 at the lower end thereof to facilitate rotation of the switch 36 and manual transfer of a load, as will be described. The switch 36 has a generally V-shaped rail 50 secured thereto as by a pair of rivets 52 (FIGS. 3 and 5), the V-shaped configuration being defined by angularly upwardly extending rail sections 54 and 56. Thus, as is best seen by comparing FIGS. 3 and 5, the rail sections 54 and 56 are movable, selectively, to the horizontal position by rotating the switch 36 about its pivot 38.

The trailer body 10 is provided with a plurality of longitudinally extending rails 60 that are suspended from the inner roof or ceiling 62 of the trailer 10 as by hangers 64. The hangers 64 have a gooseneck 66 (FIG. 4) at the lower end thereof to displace the rails 60 laterally to provide clearance for the travel of a plurality of meat-supporting trolleys 70.

As best seen in FIG. 4, each trolley 70 comprises a roller 72 supported between the legs of a generally U-shaped upper end portion 74 of a trolley frame 76. A meat-supporting hook 80 is pivotally secured to a lower end portion 82 of the trolley frame 76 as by a swivel 84. The trolleys 70 are movable longitudinally of the trailer body 10 on the rails 60 and are transferable between the rails 60 and a rail 90 of the storage facility, by the carriage 30 and switch 36, as will be described.

As best seen in FIG. 6, the rail 90 is supported by a plurality of hangers 92, 94 and 96, the hangers 92 and 94 being supported by a horizontally extending frame 100 and the hanger 96 being secured to, for example, the roof 102 of a storage facility 103. The frame 100 comprises two legs 104 and 105 that are pivotally supported by pins 106 and 107, respectively, for rotation with respect to the roof 102, elevation thereof being effected by, for example, a cable 108 connected to a yoke 109 and to a suitable winch (not shown). The hanger 94 is suspended from a member 110 that is secured to the frame 100. The hanger 94 is connected to an intermediate section 111 of the rail as by a pin 112. The hanger 92 is fixedly secured to an outer end portion 113 of the frame 100 as by bolts 114 and to an outer end portion 115 of the rail 90 as by a bolt or pin 120. The pin 120 is accepted within a slot 122 extending longitudinally of the end portion 115 of the rail 90. The end portion 115 of the rail 90 supports a bolt or pin 124 that extends through a slot 126 in the intermediate section 111 of the rail 90. Therefore, the section 115 of the rail 90 is extensible with respect to the intermediate section 111 thereof to adjust the length of the rail 90 to the spacing between the trailer body 10 and the storage facility 103.

The intermediate section 111 of the rail 90 is pivotally secured to an inner section 132 of the rail 90 by a pin 134. The juncture of the sections 111 and 132 is accomplished by overlapping end portions 136 and 138

(FIG. 9) on the sections 111 and 132, respectively, thereby to provide for elevation of the sections 111 and 115 of the rail 90 into horizontal alignment with the rails 60 of the trailer body 10.

A generally L-shaped positioning boom 150 comprising a vertical section 152 and a horizontally outwardly extending section 154 is secured to the outer end portion 113 of the frame 100, as by welding. The section 154 is pivotally secured to the vertical section 152 as by a pin 156, the angular position therebetween being adjustable as by a turnbuckle 158 that extends between a pin 160 on the boom 150 and a pin 161 on the outer end 113 of the frame 100. The turnbuckle 158 is adjustable to accommodate variations in construction of the trailer body 10.

After the trailer body 10 is positioned in proximate relation to the storage facility 103, the frame 100 is adjusted vertically, as by elevation of the cable 108, to bring the outer end portion 154 of the boom 150 into engagement with an upper edge face 162 of the header 22 which, upon proper adjustment of the turnbuckle 158, aligns the end portion 115 of the rail 90 with the rail 60 of the trailer body 10.

The rail sections 54 and 56 of the switch 36 are provided with generally hook-shaped outer end portions 170 and 172, respectively, that are engageable in complementary U-shaped terminals 174 and 176 on the end sections 178 and 115 of the rails 60 and 90, respectively. When the hook-shaped portions 170 and 172 are accepted within the respective terminals 174 and 176, selectively, the rail sections 54 and 56 are positioned and aligned with the rails 60 and 90, respectively, to facilitate movement of the trolleys 70 thereacross.

In practice, when it is desired to transfer meat from the storage facility 103 to the trailer body 10, the trailer body 10 is backed into proximate relation to the terminal end portion 115 of the rail 90 of the storage facility 103. It is to be noted that it is not required to align the rails 60 of the trailer 10 with the rail 90 assuming, of course, that the rail 90 is aligned with some portion of the trackway 20 on the inner side of the header 22 of the trailer 10.

It is to be noted that horizontal alignment of the trailer body 10 with the storage facility 103 or rail 90 is not critical as long as the turnbuckle 158 is adjusted for the spacing between the header 22 and the rails 60 of the particular trailer body onto which meat is to be loaded, vertical positioning of the end section 115 of the rail 90 with respect to the rail 60 in the trailer body 10 being accomplished by lowering the frame 100 until the outer end portion 154 of the boom 150 thereon engages the upper edge face 162 of the end header 22. If the turnbuckle 158 is properly adjusted for the particular trailer 10, the rail 90 will be in horizontal alignment with the rail 60.

In addition, horizontal spacing of the end portion 178 of the rail 60 from the end portion 115 of the rail 90 is not critical, upon spotting of the trailer body 10, because the end portion 115 of the rail 90 is extensible with respect to the portion 111 thereof.

Meat supported on the trolleys 70 is rolled outwardly of the storage facility along the track 90. The carriage 30 and the switch member 36 are then moved into transverse alignment with the rail 90, whereupon the switch 36 is rotated clockwise, as seen in FIGS. 5 and 6, so that the gooseneck 172 on the rail section 56 of the rail 50 thereof is engaged in its complementary terminal 176, on the end section 115 of the rail 90. The trolley 70 is then rolled across the rail section 56 of the rail 50 on the switch 36 to the midpoint thereof, at which time the switch section 36 is rotatable counterclockwise to an inherently stable position. The center of gravity of the trolley 70 and load thereon is directly beneath the pivot point 38 of the switch 36 with respect to the carriage 30 when the trolley 70 is at the midpoint of the rail 50. The carriage 30, including the switch 36, trolley 70 and side of beef (not shown) is then moved laterally of the trailer 10 along the trackway 20 until the rail section 54 of the rail 50 is aligned with a selected one of the rails 60 within the trailer body 10. The switch 36 is then rotated counterclockwise until the gooseneck 170 of the rail section 54 is engaged with its complementary terminal 174 whereupon the trolley 70 is rollable onto the rail 60 and into the interior of the trailer body 10.

It will be appreciated that unloading of the trailer body 10 is accomplished by reversal of the aforementioned operation, vertical alignment of the rails 60 of the trailer body 10 with the rail 90 and lateral transfer of the carriage 30 into alignment with the rail 90 being accomplished in the manner described.

From the foregoing description, it should be apparent that the conveyor system of the present invention provides for inherent stabilization of the load during transfer thereof between a rail system within the trailer body 10 and a rail system of a storage facility. Because of the provision for transverse movement of the trolley, it is not necessary to carefully align the trailer body 10 laterally with respect to the rail system of the storage facility. Horizontal alignment of the truck and storage facility rails 60 and 90, respectively, is automatically accomplished upon lowering of the frame 100 to the point at which the boom 150 engages the upper edge of the trailer body 10.

Spacing of the rear end of the trailer 10 from the terminal portion of the rail 90 is not critical because of the extensibility of the section 115 of the rail 90.

It is to be understood that the specific construction of the improved meat switching apparatus herein disclosed and described is presented for the purpose of explanation and illustration and is not intended to indicate limits of the invention, the scope of which is defined by the following claims.

What is claimed is:

1. In a conveyor system for trailer bodies and the like, a plurality of laterally spaced parallel overhead rails in said body adapted to receive and support a load carrying wheeled trolley, a carriage mounted in and movable transversely of said body to align with a selective one of said overhead rails, a pivot on said carriage, a switch suspended from said pivot and having a pair of oppositely extending upwardly inclined rail sections, said switch adapted to support a wheeled trolley and the trolley load on said switch normally holding the trolley substantially at the middle of the switch with the rail sections of the switch inclined upwardly and oppositely therefrom to stabilize said trolley and its load, said switch being rockable about said pivot in one direction to move one rail section thereof into alignment with a selected one of said overhead rails and rockable in the opposite direction to deliver a trolley supported thereon to receiving means therefor.

2. In a conveyor system for a trailer body or the like adapted for use in transferring a load carrying wheeled trolley between an overhead rail outside the body aligned therewith and spaced longitudinally from an overhead rail inside the body, a pivoted switch suspended from said body at the end of the inside rail so as to be between said inside rail and said outside rail, said switch having a pair of oppositely extending upwardly inclined rails adapted to support the trolley, the load of a trolley on said switch normally holding said trolley at the juncture of said rail sections and stabilized in a neutral position between said inclined rail sections, said switch being rockable about its pivot in one direction to move one rail section into alignment with said inside rail and in the opposite direction to move the other rail section into alignment with said outside rail.

3. In a conveyor system, a pair of longitudinally spaced-apart overhead rails disposed in substantially the same horizontal plane and adapted to support conventional load carrying wheeled trolleys, suspension means adapted to align with said rails, a pivot on said suspension means, a switch suspended from said pivot and having a pair of oppositely extending, upwardly inclined rail sections, said switch also adapted to support a wheeled trolley with the latter centralized and stabilized thereon by said inclined rail sections, said switch being rockable on said pivot in one direction to bring one rail section into cooperative relationship to a rail at one side of the switch and rockable in the opposite direction to bring the other of said rail sections into cooperative relationship with a rail at the other side of the switch.

4. In a conveyor system, a plurality of laterally spaced parallel overhead storage rails, an overhead supply rail spaced longitudinally from and in substantially the same horizontal plane as said storage rails, a carriage disposed between said supply rail and said storage rails and movable transversely relative thereto, a pivot on said carriage, a switch suspended from said pivot and movable with said carriage to align with a selected one of said rails, said switch having a pair of oppositely extending upwardly inclined rail sections adapted to cooperate with said supply rail and with a selected one of said storage rails respectively and being normally positioned with the rail sections thereof inclined angularly with respect to said rails but being rockable on said pivot to move said rail sections into interfitting engagement with a selected one of said rails.

5. In a trailer body or the like, a plurality of laterally spaced parallel overhead rails for supporting conventional load carrying wheeled trolleys, an overhead trackway extending transversely of the body at one end of said rails, a carrier movable along said trackway for selective alignment with said rails, a pivot on said carrier, a switch suspended from said pivot having a generally V-shaped rail section, said switch being normally disposed in substantially the same horizontal plane as said rails and adapted to carry one of said wheeled trolleys at the apex of said rail section, actuator means on said switch for tipping the latter to bring one end of said rail section into alignment with a selected one of said rails to permit a wheeled trolley to roll between said rail section and said rail, the other end of said rail section adapted to cooperate with a conventional overhead conveyor rail exteriorly of the trailer body and said switch being rockable on said pivot to bring said other end of said rail section into alignment with said overhead conveyor rail to permit rolling transfer of a wheeled trolley between said rail section and said rail.

6. The combination as set forth in claim 5 wherein the pivot mounting for said switch is disposed above said rail section so that a wheeled trolley on said rail section is normally stabilized at the apex thereof.

7. The combination as set forth in claim 5 wherein said actuator is a manually operable handle on and depending from said rail section and wherein said pivot is connected to the upper end of said handle.

8. The combination as set forth in claim 5 including means for detachable interconnecting one end of said rail section and a selected one of said rails with the connected portion of the rail section in alignment with and substantially parallel to said rail.

9. A conveyor system comprising a trailer body or the like having a doorway and a plurality of laterally spaced, parallel overhead rails extending from said doorway and adapted to support conventional load carrying wheeled trolleys, a stationary overhead conveyor rail disposed to be substantially in the same horizontal plane as the rails in said trailer body and also adapted to support said wheeled trolleys for transportation thereof to and from said body, a pivoted cantilever structure having a vertically movable and extensible rail section pivotally connected at one end to said stationary overhead conveyor rail and forming an extension thereof and including a vertically adjustable supporting arm disposed to extend over said trailer body and adapted to be supported thereon to hold said extensible rail section in alignment with said doorway and spaced longitudinally from the overhead rails in said body, a trackway extending transversely of said body and said overhead rails at said doorway disposed to be between said overhead rails and said rail section, a carriage movable in said trackway, a pivot on said carriage and a switch suspended from said carriage, said switch having a generally V-shaped rail section and being movable along said trackway with said carriage and into juxtaposition with a selected one of said overhead rails or with said extensible rail section and rockable on said pivot to bring the ends of said rail section into engagement with a selected one of said overhead rails or said extensible rail sections, selectively.

10. A conveyor system comprising a trailer body or the like having a doorway and a plurality of laterally spaced parallel overhead rails extending from said doorway and adapted to support conventional load carrying wheeled trolleys, a stationary overhead conveyor rail disposed to be substantially in the same horizontal plane as the rails in said trailer body and also adapted to support said wheeled trolleys for transportation thereof to and from said body, a pivoted cantilever structure having a vertically movable and extensible rail section pivotally connected at one end to said stationary overhead conveyor and forming an extension thereof and including a vertically adjustable supporting arm disposed to extend over said trailer body and adapted to be supported thereon to hold said rail section in alignment with said doorway and spaced longitudinally from the overhead rails in said body, a trackway extending transversely of said body and said rails at said doorway disposed to be between said overhead rails and said rail section, a carriage movable in said trackway, a pivot on said carriage, a switch suspended from said carriage, said switch having a generally V-shaped rail section and being movable along said trackway with said carriage and into juxtaposition with a selected one of said overhead rails, said rail section being rockable on said pivot to bring the ends of said rail section selectively into engagement and alignment with said selected overhead rail or said stationary rail section, and means for detachably connecting said rail section to said selected overhead rail or said stationary rail section and for supporting the same in alignment with each other for rolling transfer of said wheeled trolleys between said stationary rail section and said overhead rails.

No references cited.